(12) United States Patent
Mouret et al.

(10) Patent No.: US 11,099,070 B2
(45) Date of Patent: Aug. 24, 2021

(54) HIGH-FINENESS FABRY-PEROT CAVITY AND METHOD THEREFOR

(71) Applicant: UNIVERSITE DU LITTORAL COTE D'OPALE, Dunkirk (FR)

(72) Inventors: Gaël Mouret, Gravelines (FR); Francis Hindle, Esquelbecq (FR); Robin Bocquet, Chereng (FR)

(*) Notice: Subject to any disclaimer, the term of this patent is extended or adjusted under 35 U.S.C. 154(b) by 0 days.

(21) Appl. No.: 16/624,123

(22) PCT Filed: Jun. 22, 2018

(86) PCT No.: PCT/EP2018/066796
§ 371 (c)(1),
(2) Date: Dec. 18, 2019

(87) PCT Pub. No.: WO2019/002139
PCT Pub. Date: Jan. 3, 2019

(65) Prior Publication Data
US 2020/0132545 A1    Apr. 30, 2020

(30) Foreign Application Priority Data

Jun. 29, 2017   (FR) ...................... 1756059

(51) Int. Cl.
*G01J 3/26* (2006.01)
*G01N 21/3586* (2014.01)
*G02B 26/00* (2006.01)
*G01J 3/02* (2006.01)

(52) U.S. Cl.
CPC ............ *G01J 3/26* (2013.01); *G01N 21/3586* (2013.01); *G02B 26/001* (2013.01); *G01J 3/021* (2013.01)

(58) Field of Classification Search
CPC ........ G01J 3/26; G01J 3/021; G01N 21/3586; G02B 26/001; G01D 5/266; G01D 5/353; G01D 5/35306
See application file for complete search history.

(56) References Cited

U.S. PATENT DOCUMENTS

| | | | |
|---|---|---|---|
| 7,012,696 B2 | 3/2006 | Orr et al. | |
| 2003/0231844 A1* | 12/2003 | Kersey | G02B 6/29317 385/124 |
| 2011/0170116 A1* | 7/2011 | Homa | G01K 11/3206 356/498 |

FOREIGN PATENT DOCUMENTS

WO    WO 2014/174494 A2    10/2014

OTHER PUBLICATIONS

Bridget Alligood Deprince et al: "Extending high-finesse cavity techniques to the far-infrared", Review of Scientific Instruments., vol. 84, No. 7, Jul. 1, 2013 (Jul. 1, 2013), p. 075107, XP055453442, US ISSN: 0034-6748, DOI: 10.1063/1.4813274, Paragraph V.

(Continued)

*Primary Examiner* — Jonathan M Hansen
(74) *Attorney, Agent, or Firm* — Anglehart et al.

(57) ABSTRACT

The present disclosure relates to a high-fineness Fabry-Perot cavity (for use in the THz range) with a guide comprising lateral cavities arranged to guide an electromagnetic wave into the cavity. The invention also relates to a method for implementing a device including such a Fabry-Perot cavity.

17 Claims, 3 Drawing Sheets

(56) References Cited

OTHER PUBLICATIONS

De Rijk E et al: "Note: Stacked rings for terahertz wave-guiding", Review of Scientific Instruments, AIP, Melville, NY, US, vol. 82, No. 6, Jun. 8, 2011 (Jun. 8, 2011), pp. 66102-66102, XP012146540.
French application No. 1756059 search report dated Feb. 23, 2018.
International application No. PCT/EP2018/066796 English Translation of the Written Opinion of the International Searching Authority dated Sep. 20, 2018.
International application No. PCT/EP2018/066796 International Preliminary Report on Patentability Chapter I dated Dec. 31, 2019.
International application No. PCT/EP2018/066796 International Search Report dated Sep. 20, 2018.
International application No. PCT/EP2018/066796 Search Strategy dated Sep. 20, 2018.
International application No. PCT/EP2018/066796 Translation of the International Search Report dated Sep. 20, 2018.
International application No. PCT/EP2018/066796 Written Opinion of the International Searching Authority dated Sep. 20, 2018.
Qi C-C et al: "A 1.35mJ ammonia Fabry-Perot cavity terahertz pulsed laser with metallic capacitive-mesh input and output couplers", Optics and Lasers in Engineering, Elsevier, Amsterdam, NL.
R. Braakman et al. "Principles and promise of Fabry-Perot resonators at terahertz frequencies", Journal of Applied Physics 109, 063102 (2011); https://doi.org/10.1063/1.3560771, Published Online: Mar. 17, 2011, Accepted: Jan. 2011.

\* cited by examiner

HIGH-FINENESS FABRY-PEROT CAVITY AND METHOD THEREFOR

TECHNICAL FIELD

The present disclosure relates to the field of interferometry and more specifically concerns a Fabry-Perot cavity, as well as a method therefor.

BACKGROUND

Fabry-Perot resonators making it possible to explore different domains of the electromagnetic spectrum are known in the state of the prior art.

Recently, the scientific community has attempted to increase the finesse of Fabry-Perot resonators to explore the field of terahertz frequencies (THz) of electromagnetic waves, i.e. a frequency spectrum typically comprised between 100 and 3000 GHz, which corresponds to a vacuum wavelength comprised between 3 mm and 0.1 mm. In particular, the following documents describe devices improving the finesse of Fabry-Perot resonators between 100 and 3000 GHz:

DePrince et al. (2013) *Extending high-finesse cavity techniques to the far-infrared*, Review of Scientific Instruments, Vol. 84(7);

Braakman and Blake (2011) *Principles and promise of Fabry-Perot resonators at terahertz frequencies*, Journal of Applied Physics, Vol. 109(6).

However, the Fabry-Perot resonators known in the state of the prior art do not make it possible to reach finesses greater than 250 between 100 and 3000 GHz.

A purpose of the present disclosure is in particular to improve the finesse of a Fabry-Perot cavity in the field of terahertz waves.

SUMMARY

To this end, the present disclosure proposes a device comprising:
- a first reflector and a second reflector,
- a Fabry-Perot cavity comprising an inlet formed by the first reflector and an outlet formed by the first or the second reflector, the Fabry-Perot cavity having a length delimited by the first and the second reflector,
- an emitter arranged to emit an electromagnetic wave with a wavelength λ greater than 100 µm and/or less than 3 mm at the inlet of the Fabry-Perot cavity,
- a guide arranged to propagate the electromagnetic wave in the Fabry-Perot cavity, from the inlet of the Fabry-Perot cavity to the outlet thereof,
- a sensor arranged to capture the electromagnetic wave exiting via the outlet of the Fabry-Perot cavity,
the guide forming a hollow tube extending in a longitudinal direction, the inside of the tube comprising lateral cavities arranged to guide the electromagnetic wave in the Fabry-Perot cavity.

Throughout the present document, each wavelength λ under consideration with respect to a wave is the "vacuum" wavelength, even if in reality this wave does not propagate in a vacuum, and thus obeys the relationship:

$$\lambda = \frac{C}{\nu}$$

with C the speed of light in a vacuum, and ν the frequency of this wave.

Thus, the guide forms a tube provided with lateral cavities, in particular lateral cavities which succeed one another in the longitudinal direction. In other words, the device according to the present disclosure comprises a corrugated guide situated inside the Fabry-Perot cavity.

Such a device according to the present disclosure makes it possible to increase the finesse with respect to the devices known in the state of the prior art.

In particular, such a device according to the present disclosure makes it possible to confine the electromagnetic wave, and thus avoid any radiation loss by diffraction, in the minimum-loss mode of the guide.

Such a device according to the present disclosure also makes it possible to avoid or to limit the alignment difficulties posed by Fabry-Perot resonators of the state of the prior art.

Moreover, such a device according to the present disclosure is of relatively simple design with respect to the Fabry-Perot resonators of the state of the prior art operating in the domain between 100 and 3000 GHz.

Preferably, the guide and/or the inside of the tube can have rotational symmetry about an axis of symmetry parallel to the longitudinal direction.

The lateral cavities can each consist of a groove produced in the tube over the entire inner circumference of the tube.

Such a guide makes it possible to confine the electromagnetic wave and to avoid losses due to diffraction.

In an embodiment, such a guide makes it possible to use high-reflectivity grids, which are ideal for THz, as reflectors instead of curved mirrors, which do indeed allow the electromagnetic wave to be confined and reduce diffraction losses, but are not available with sufficient reflexivity for THz.

Such a guide can be used at atmospheric pressure, but also makes it possible to have a closed cavity (preferably under vacuum), for example to carry out gas detection.

By reducing any diffraction loss which may be significant in this frequency range, the assembly makes it possible to reach significant finesses so far never demonstrated in this frequency range. Thus, such a guide makes it possible to reduce the propagation losses of the electromagnetic wave and thus contributes directly to the good performance of the device according to the present disclosure.

Preferably, the emitter can be arranged to emit an electromagnetic wave with a wavelength λ, at the inlet of the Fabry-Perot cavity, greater than 100 µm and/or less than 900 µm, for example equal to 500 µm ±10%.

The dimensions and the arrangement of the lateral cavities are ideally determined as a function of the preferred wavelength λ.

Preferably, the lateral cavities can be spaced apart by a pitch P between the first and the second reflector.

In other words, two contiguous lateral cavities can be spaced apart by said pitch P.

For all the cavities, this pitch P is preferably constant, or substantially constant around an average value ±30% or even preferably ±15%.

Between the first and the second reflector, the lateral cavities can be regularly spaced apart by a constant pitch P.

When the device according to the present present disclosure is designed, each pitch P or the average value of the pitch P can preferably be determined as a function of the wavelength λ which it is desired to implement.

Each pitch P can be greater than λ/5 and/or less than λ/2; and/or equal to λ/3±30% (λ/3−30%<P<λ/3+30%) or even preferably ±15% (λ/3−15%<P<λ/3+15%).

Thus in an embodiment example, each pitch P can be greater than 100 μm and/or less than 250 μm, preferably greater than 116 μm and/or less than 216 μm. Preferably, each pitch P can be equal to 120 μm ±20% or even preferably ±10%.

Each lateral cavity can preferably have a length w, defined parallel to the longitudinal direction of the guide. All the lengths w of the different cavities are preferably equal to one another, optionally to ±20% or even preferably ±10%. When the device according to the present disclosure is designed, the length w can preferably be determined as a function of the wavelength λ which it is desired to implement.

The length w of each cavity can be greater than λ/10 and/or less than λ/4; and/or equal to λ/6±30% or even preferably ±15%.

The length of each cavity w can be less than or equal to λ/6.

Thus, in an embodiment example, the length of each cavity w can be greater than 50 μm and/or less than 125 μm, preferably equal to 60 μm ±20% or even preferably ±10%.

The length of each cavity w is preferably less than or equal to half of each pitch P separating this same cavity from its adjoining cavities.

Each lateral cavity can preferably have a thickness d, defined perpendicular to the longitudinal direction of the guide.

All the thicknesses d of the different cavities are preferably equal to one another, optionally to ±20% or even preferably ±10%.

When the device according to the present disclosure is designed, the thickness d can preferably be determined as a function of the wavelength λ which it is desired to implement.

The thickness d of each cavity can be greater than λ/8 and/or less than λ/2; and/or equal to λ/4±20% or even preferably ±10%.

Thus, in an embodiment example, the thickness d of each cavity can be greater than 100 μm and/or less than 200 μm, preferably equal to 125 μm ±20% or even preferably ±10%.

With respect to the tube, this can have a minimum inner diameter a greater than 10λ; in this case it is known as an oversized guide.

Thus the minimum inner diameter a can be greater than 10 mm in particular for an implementation at λ=500 μm.

The minimum inner diameter is defined as an inner diameter of the tube in a plane of section perpendicular to the longitudinal direction and not passing through a lateral cavity.

The inner cross-section of the tube can have different forms. By the expression "inner cross-section of the tube" is meant the inner cross-section of the tube in said plane of section perpendicular to the longitudinal direction and not passing through a lateral cavity.

Preferably, the tube can have a circular inner cross-section.

A tube having a circular inner cross-section makes it possible to simplify the design and/or reduce costs.

Alternatively, the tube can have any inner cross-section (for example square or rectangular). In such a case, said minimum inner diameter corresponds in the present description to the inner dimension of the smallest tube, considered in said plane of section perpendicular to the longitudinal direction and not passing through a lateral cavity. For example, in the case of a square section tube, said minimum inner diameter corresponds to the dimension of one side of the square. In the case of a rectangular section tube, said minimum inner diameter corresponds to the dimension of the smallest side of the rectangle.

The first reflector and the second reflector can each comprise an inductive grid.

Typically, such an inductive grid comprises a mesh defining apertures between different cells of material.

For example, the inductive grid can be made from copper and/or have a thickness of 1.6 μm, a pitch of 16.9 μm between the cells and/or a cell width of 8.4 μm.

Such an inductive grid makes it possible to have an excellent reflectivity.

Such an inductive grid makes it possible to have a transmission coefficient independent of the orientation of the electrical field, which is not the case for grids having tensioned wires, which require a perfectly controlled orientation (all of the wires in one and the same plane in pairs) so the Fabry-Perot cavity functions without adjusting the orientation of the grids.

Such an inductive grid has better mechanical solidity than tensioned wires, and is generally less costly.

Alternatively, the first reflector and/or the second reflector can comprise a capacitive (preferably devoid of substrate) or a polarizing grid, and/or a photonic mirror.

Such a capacitive grid preferably devoid of substrate comprises a mesh defining apertures between different cells of material.

Such a capacitive (preferably devoid of substrate) or inductive grid has the technical advantage of allowing a gas to enter into the Fabry-Perot cavity directly through this grid, which facilitates the entry of gas into the cavity (with respect to a specific inlet with separate ducts) and improves the homogeneity thereof and the diffusion of the gas in the cavity (with respect to a gas inlet that is off-centre and/or formed by a tube opening onto the length of the cavity).

The device according to the present disclosure can also comprise at least one actuator arranged to provide translational movement in the longitudinal direction of at least one, preferably both, of the first reflector and the second reflector so as to vary the length of the Fabry-Perot cavity.

In a variant of this embodiment, the device according to the present disclosure can comprise a first actuator and a second actuator, the first actuator being arranged to provide the translational movement of the first reflector in the longitudinal direction, the second actuator being arranged to provide the translational movement of the second reflector in the longitudinal direction.

Preferably, the at least one actuator can be piezoelectric.

The emitter of the device according to the present disclosure can preferably be arranged to vary the wavelength λ.

In an embodiment of the device according to the present disclosure comprising such an emitter and said at least one actuator, the device according to the present disclosure can also comprise control means arranged and/or programmed to drive the emitter and the at least one actuator so as to:
  vary the wavelength λ of the electromagnetic wave emitted by the emitter,
  receive a signal received by the sensor during variation of the wavelength λ,
  control the length of the Fabry-Perot cavity as a function of the signal received by the sensor, so as to maximize an amplitude or power or intensity of the signal received by the sensor.

The device according to the present disclosure can also comprise a database referencing several substances, and comprise processing means arranged, and/or programmed to provide data on at least one substance contained in the Fabry-Perot cavity, as a function of a processing of a signal received by the sensor with the database.

The device according to the present disclosure can also comprise means for measuring and/or regulating the pressure inside the Fabry-Perot cavity.

The device according to the present disclosure can also comprise conversion means to convert a mode of the electromagnetic wave before the entry thereof into the Fabry-Perot cavity and/or after the exit thereof from the Fabry-Perot cavity.

In particular, the conversion means can be arranged in order that:
  the mode of the electromagnetic wave emitted by the emitter and/or detected by the sensor are a $TEM_{00}$ mode, and/or
  the mode of the electromagnetic wave inside the Fabry-Perot cavity is an $HE_{11}$ mode.

The $TEM_{00}$ and $HE_{11}$ modes denote modes of propagation of the electromagnetic wave.

According to another aspect, the present disclosure proposes a method implemented by a device (preferably by the device according to the present disclosure as previously described), this device comprising:
  a first reflector and a second reflector,
  a Fabry-Perot cavity comprising the inlet formed by the first reflector and the outlet formed by the first or the second reflector, the Fabry-Perot cavity having a length delimited by the first and the second reflector,
  the method according to the present disclosure comprising:
    emitting an electromagnetic wave with a wavelength $\lambda$ greater than 100 μm and/or less than 3 mm (preferably less than 900 μm) at the inlet of the Fabry-Perot cavity, this emission preferably being realized by the emitter of the device according to the present disclosure as previously disclosed,
    propagating the electromagnetic wave in the Fabry-Perot cavity, from the inlet of the Fabry-Perot cavity to the outlet thereof, this propagation being carried out by a guide, the guide forming a hollow tube extending in the longitudinal direction, the inside of the tube comprising lateral cavities, the guide preferably being the guide of the device according to the present disclosure as previously disclosed,
    guiding the electromagnetic wave in the Fabry-Perot cavity by the lateral cavities,
    detecting the electromagnetic wave exiting via the outlet of the Fabry-Perot cavity, this detecting preferably being carried out by the sensor of the device according to the present disclosure as previously disclosed.

Preferably, the lateral cavities can be spaced apart by a pitch P, between the first and the second reflector.

In other words, two contiguous lateral cavities can be spaced apart by said pitch P.

For all of the cavities, this pitch P is preferably constant or substantially constant around an average value ±30% or even preferably ±15%.

The lateral cavities can be regularly spaced by a constant pitch P, between the first and the second reflector.

When the device according to the present disclosure is designed, each pitch P or the average value of the pitch P can preferably be determined as a function of the wavelength $\lambda$ which it is desired to implement.

Each pitch P can be greater than $\lambda/5$ and/or less than $\lambda/2$; and/or equal to $\lambda/3\pm30\%$ ($\lambda/3-30\%<P<\lambda/3+30\%$) or even preferably ±15% ($\lambda/3-15\%<P<\lambda/3+15\%$).

Thus in an embodiment example, each pitch P can be greater than 100 μm and/or less than 200 μm, preferably greater than 115 μm and/or less than 170 μm. Preferably, each pitch P can be equal to 120 μm ±20% or even preferably ±10%.

Each lateral cavity can preferably have a length w, defined parallel to the longitudinal direction of the guide.

All the lengths w of the different cavities are preferably equal to one another, optionally to ±20% or even preferably ±10%.

It is possible to determine the length w as a function of the wavelength $\lambda$ which it is desired to implement.

The length of each cavity w can be greater than $\lambda/10$ and/or less than $\lambda/4$; and/or equal to $\lambda/6\pm30\%$ or even preferably ±15%.

The length of each cavity w can be less than or equal to $\lambda/6$.

Thus, in an embodiment example, the length of each cavity w can be greater than 50 μm and/or less than 125 μm, preferably equal to 60 μm ±20% or even preferably ±10%.

The length of each cavity w can be less than or equal to half of each pitch P separating this same cavity from its surrounding cavities.

Each lateral cavity can preferably have a thickness d, defined perpendicular to the longitudinal direction of the guide.

All the thicknesses d of the different cavities are preferably equal to one another, optionally to ±20% or even preferably ±10%.

It is possible to determine the thickness d as a function of the wavelength $\lambda$ which it is desired to implement.

The thickness d of each cavity can be greater than $\lambda/8$ and/or less than $\lambda/2$; and/or equal to $\lambda/4\pm20\%$ or even preferably ±10%.

Thus, in an embodiment example, the thickness d of each cavity can be greater than 100 μm and/or less than 200 μm, preferably equal to 125 μm ±20% or even preferably ±10%.

With respect to the tube, this can have a minimum inner diameter a greater than $10\lambda$.

The minimum inner diameter a can be greater than 10 mm.

This inner minimum diameter is preferably defined as disclosed for the device according to the present disclosure.

The first reflector and the second reflector can each comprise an inductive grid.

Typically, such an inductive grid comprises a mesh defining apertures between different cells of material.

For example, the inductive grid can be made from copper and/or have a thickness of 1.6 μm, a pitch of 16.9 μm between the cells and a cell width of 8.4 μm.

Alternatively, the first reflector and/or the second reflector can comprise a capacitive (preferably devoid of substrate) or a polarizing grid, and/or a photonic mirror.

Such a capacitive grid preferably devoid of substrate comprises a mesh defining apertures between different cells of material.

Such a capacitive (preferably devoid of substrate) or inductive grid has the technical advantage of allowing a gas to enter into the Fabry-Perot cavity directly through this grid, which facilitates the entry of gas into the cavity (with respect to a specific inlet with separate ducts) and improves the homogeneity thereof and the diffusion of the gas in the cavity (with respect to a gas inlet that is off-centre and/or formed by a tube opening onto the length of the cavity).

The method according to the present disclosure can comprise a translational movement in the longitudinal direction of at least one, preferably both, of the first reflector and the second reflector so as to vary the length of the Fabry-Perot cavity, this translational movement preferably being carried out by the at least one actuator of the device according to the present disclosure as disclosed above. The method according to the present disclosure can comprise a translational movement by the first actuator of the first reflector in the longitudinal direction, and a translational movement by the second actuator of the second reflector in the longitudinal direction.

Preferably, the at least one actuator can be piezoelectric.

Preferably, the process according to the present disclosure comprises a variation of the wavelength $\lambda$, this variation preferably being carried out by the emitter of the device according to the present disclosure as disclosed above.

The method according to the present disclosure can comprise driving (preferably the emitter and the at least one actuator by the control means of the device according to the present disclosure as disclosed above) so as to:
  vary the wavelength $\lambda$ of the emitted electromagnetic wave (preferably by the emitter),
  receive a signal received (preferably by the sensor) during variation of the wavelength $\lambda$,
  control the length of the Fabry-Perot cavity as a function of the signal received so as to maximize an amplitude or power or intensity of the signal received.

The method according to the present disclosure can comprise processing the signal received by the sensor with a database referencing several substances and supplying data on at least one substance contained in the Fabry-Perot cavity as a function of this processing, this processing and this supply of data preferably being carried out by the processing means of the device according to the present disclosure as disclosed above.

The method according to the present disclosure can comprise measuring and/or regulating the pressure inside the Fabry-Perot cavity, preferably using measurement and/or regulation means of the device according to the present disclosure as disclosed above.

The method according to the present disclosure can comprise conversion of a mode of the electromagnetic wave before the entry thereof into the Fabry-Perot cavity and/or after the exit thereof from the Fabry-Perot cavity, this conversion preferably being carried out by the conversion means of the device according to the present disclosure as disclosed above.

In particular:
  emission by the emitter and/or detection by the sensor can be emission and/or detection of the electromagnetic wave in the $TEM_{00}$ mode, and/or
  propagation can be a propagation of the electromagnetic wave inside the Fabry-Perot cavity in the $HE_{11}$ mode.

In an alternative, the method according to the present disclosure can comprise a measurement of the losses of the guide and/or of a reflectivity of at least one or each of the reflectors, preferably by:
  two measurements of a finesse of the device or devices according to the present disclosure using the same reflectors and the same type of guide, but with two different lengths separating the two reflectors, and
  from these two finesse measurements, calculating (by calculation means which are technical means, preferably comprising at least one computer, a central or calculation unit, an analogue electronic circuit (preferably dedicated), a digital electronic circuit (preferably dedicated), and/or a microprocessor (preferably dedicated) and/or software means) losses of the guide and/or a reflectivity of at least one or each of the reflectors, typically by solving a system of two equations with two unknowns.

BRIEF DESCRIPTION OF THE DRAWINGS

Other advantages and characteristics of the present disclosure will become apparent on reading the detailed description of implementations and embodiments that are in no way limitative, and from the following attached figures.

DETAILED DESCRIPTION

As the embodiments described hereinafter are in no way limitative, variants of the present disclosure can in particular be considered comprising only a selection of the characteristics described, in isolation from the other characteristics described (even if this selection is isolated within a phrase comprising these other characteristics), if this selection of characteristics is sufficient to confer a technical advantage or to differentiate the present disclosure with respect to the state of the art. This selection comprises at least one, preferably functional, characteristic without structural details, or with only a part of the structural details if this part alone is sufficient to confer a technical advantage or to differentiate the present disclosure with respect to the state of the prior art.

Figure 1:
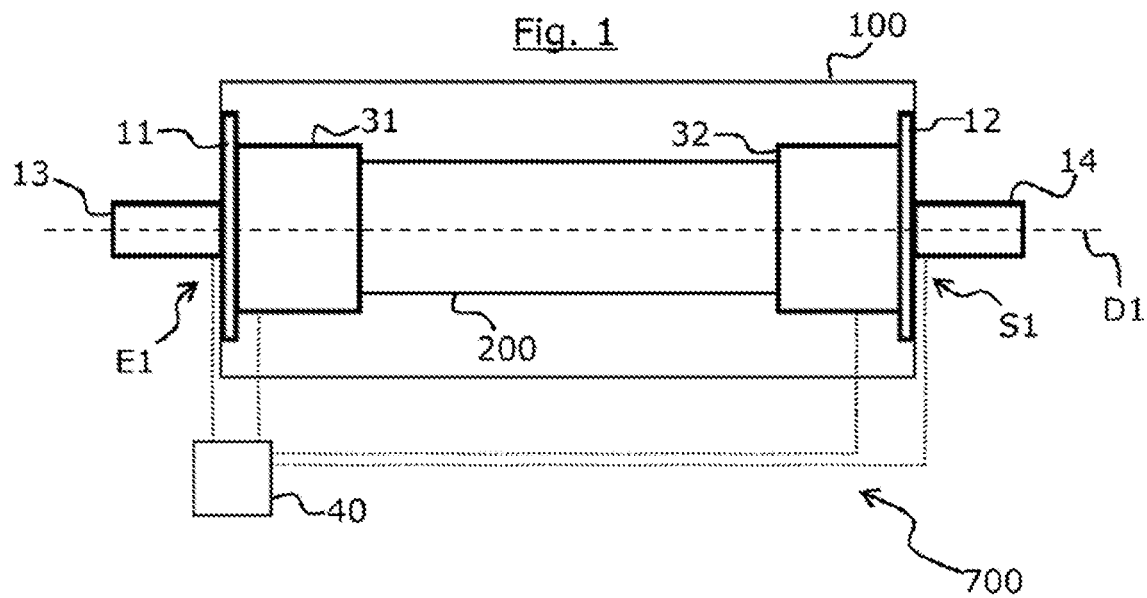
FIG. 1 represents a preferential embodiment of the device 700 according to the present disclosure.

FIG. 1 represents an embodiment example of a device 700 according to the present disclosure.

The device 700 comprises a first reflector 11 and a second reflector 12. In this example, each of the reflectors 11 and 12 comprises an inductive grid (not shown) provided with a mesh defining apertures between different cells of material. For example, the inductive grid can be made from copper and have a thickness of 1.6 µm, a pitch of 16.9 µm between the cells and a cell width of 8.4 µm (not shown).

The device 700 comprises a Fabry-Perot cavity 100 comprising an inlet E1 formed by the first reflector 11 and an outlet S1 formed by the second reflector 12.

The Fabry-Perot cavity 100 has a length delimited between the first reflector 11 and the second reflector 12. This length is measured in the longitudinal direction D1.

The reflector 11 is planar and not curved.
The reflector 12 is planar and not curved.
The device 700 comprises an emitter 13 arranged to emit an electromagnetic wave with a wavelength $\lambda$.

This emitter 13 is in this example arranged to vary the wavelength $\lambda$.

At the inlet E1 of the Fabry-Perot cavity 100 and/or at the outlet of the emitter 13, the wavelength $\lambda$ is in this example equal to 500 µm ±10%. The present disclosure is however not limited to such a wavelength, the latter being able in particular to be greater than 100 µm and/or less than 3 mm or even 900 µm at the entry to the Fabry-Perot cavity 100 and/or at the exit from the emitter 13.

The device 700 comprises a sensor 14 arranged to detect the electromagnetic wave exiting via the outlet S1 of the Fabry-Perot cavity 100.

An important element of the device 700 consists of a guide 200 of this device 700.

The emitter 13 comprises:
a frequency multiplication chain driven by a frequency synthesizer (VDI Synthesizer (Virginia Diodes, Inc.)).
a lens, situated between the multiplication chain and the inlet E1, for good coupling of the electromagnetic wave in the lowest-loss mode of the waveguide 200.

The multiplication chain can be:
WR10AMC Amplifier/Multiplier Chains (Virginia Diodes, Inc.): 70-110 GHz; and/or
WR5.1x2, Broadband Doubler (Virginia Diodes, Inc.): 140-220 GHz; and/or
WR1.5x3, Broadband Tripler (Virginia Diodes, Inc.): 500-750 GHz The sensor 14 comprises:
a Schottky diode operating at ambient temperature (WR1.5 ZBD (Virginia Diodes, Inc.), and
a lens, situated between the outlet S1 and the Schottky diode, for good coupling of the electromagnetic wave detected with the waveguide 200.

As will be seen below, this guide 200 is an oversized corrugated very low-loss waveguide.

Parallel to the longitudinal direction D1, the guide 200 has a length greater than three times the average value of P, in the present case a length equal to 180.80 mm.

The guide 200 is typically made from metal (preferably having good electrical conductivity, made from an alloy or not) preferably made from gold, copper and/or silver. A guide made from any other material having good electrical conductivity may also be envisaged, or made from a dielectric material such as quartz.

The guide 200 is arranged to propagate the electromagnetic wave in the Fabry-Perot cavity 100, from the inlet E1 of the Fabry-Perot cavity 100 to the outlet S1 thereof.

The guide 200 forms a hollow tube which extends in a longitudinal direction D1. This direction D1 is called longitudinal because it extends in the Fabry-Perot cavity 100 passing on the one hand through the first reflector 11 and on the other hand through the second reflector 12.

Figure 2:
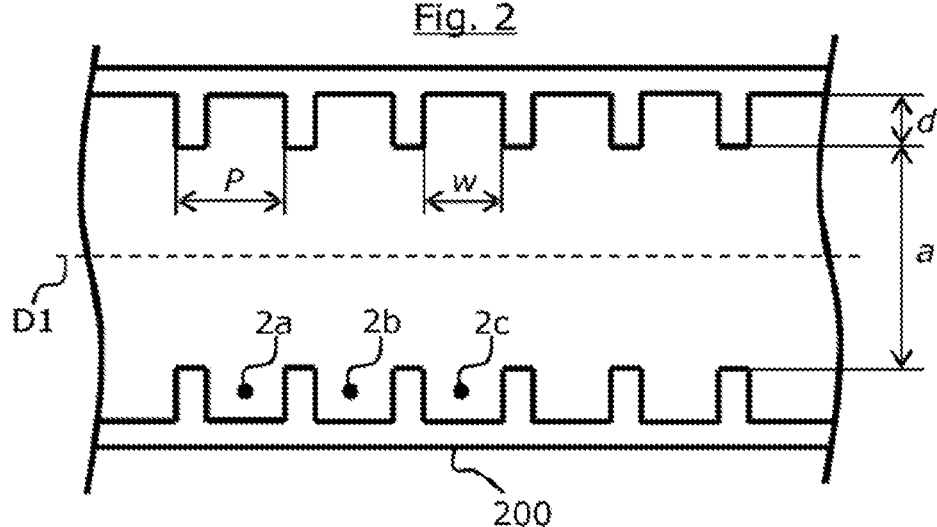
FIG. 2 represents a corrugated guide of the device 700 according to the present disclosure.

The guide 200 and the inside of the tube (i.e. in particular the cavities) have a rotational symmetry about the axis of symmetry parallel to the longitudinal direction D1, this axis being illustrated by a dotted line in FIGS. 1 and 2.

With reference to FIG. 2, the inside of the tube comprises lateral cavities 2a, 2b and 2c or grooves arranged to guide the electromagnetic wave in the Fabry-Perot cavity 100. These lateral cavities 2a-2c, or corrugations, succeed one another in the longitudinal direction D1. For the sake of clarity in FIG. 2, only seven cavities are illustrated therein, and only three of these cavities are reference respectively 2a, 2b and 2c.

In this example, the tube 200 has a circular inner cross-section defined by a minimum inner diameter a.

In an embodiment, the dimensions of the lateral cavities 2a-2c depend on the wavelength $\lambda$ of the electromagnetic wave and/or the minimum inner diameter a. Typically:
the minimum inner diameter a is greater than $10\lambda$ and greater than 10 mm;
between the first reflector 11 and the second reflector 12, the lateral cavities 2a-2c are regularly spaced apart by a pitch P. For all the cavities, this pitch P is preferably constant or substantially constant around an average value ±30% and even preferably ±15%. Each pitch P as well as the average value of the pitch P is greater than $\lambda/5$ and less than $\lambda/2$, and equal to $\lambda/3\pm30\%$ and even ±15%; thus in the context of implementation for operation at $\Delta=500$ μm each pitch P is greater than 100 μm and less than 250 μm, and even greater than 116 μm and less than 216 μm;
each lateral cavity 2a-2c has a length w, defined parallel to the longitudinal direction D1 of the guide 200, less than P/2, i.e. less than $\lambda/6$. w is greater than $\lambda/10$ and less than $\lambda/4$, and equal to $\lambda/6\pm30\%$ and even ±15%, and greater than 50 μm and/or less than 125 μm, preferably equal to 60 μm ±10%; thus in the context of implementation for operation at $\lambda=500$ μm, the length w must be less than 108 μm and greater than 58 μm, and ideally less than 83 μm.
each lateral cavity 2a-2c has a thickness d, defined perpendicular to the longitudinal direction D1 of the guide 200, greater than $\lambda/8$ and less than $\lambda/2$, and equal to $\lambda/4\pm20\%$ and even ±10%, and greater than 100 μm and/or less than 200 μm, preferably equal to 125 μm ±10%. Thus, in the context of implementation for operation at $\lambda=500$ μm, the thickness d must be equal to 125 μm ±20% or even preferably ±10%, and thus greater than 100 μm and less than 150 μm These values of a, P, w, and d as a function of A are valid for all the values of $\lambda$ during implementation of the embodiment of the method according to the present disclosure described below, for which $\lambda$ varies in its wavelength working range.

In the embodiment in FIG. 2, the length w is less than half of the pitch P. In an embodiment that is not shown, the length w can be equal to half of the pitch P.

The device 700 also comprises a first actuator 31 and a second actuator 32 respectively arranged to translate the first reflector 11 and the second reflector 12 in the longitudinal direction D1 so as to vary the length of the Fabry-Perot cavity 100.

The first 31 and the second 32 actuators are preferably piezoelectric.

The device 700 comprises control means 40 arranged and/or programmed to control the emitter 13 and the actuators 31 and 32 so as to:
vary the wavelength $\lambda$ of the electromagnetic wave emitted by the emitter 13,
receive a signal received by the sensor 14 during variation of the wavelength $\lambda$,
control the length of the Fabry-Perot cavity 100 as a function of the signal received by the sensor 14 so as to maximize an amplitude or power or intensity of the signal received by the sensor 14.

The means 40 comprise the following means:
a synchronous detection (Signal Recovery model 7230);
a (computer) means arranged and/or programmed to acquire data and drive the synthesizer of the source 13;
a proportional-integral-derivative loop (or "PID", for example provided by a computer by means of an analogue-to-digital/digital-to-analogue card) arranged and/or programmed to control the length of the cavity 100 over a transmission maximum (on a resonator resonance) by acting on two piezoelectric actuators 31, 32 over which the inductive grids 11, 12 are placed.

The correction signal produced by the PID loop drives a high-voltage supply (E-508.00 (Physik Instrument)) for the use of the piezoelectric actuators 31, 32.

The device 700 also comprises a database (not shown) referencing several substances as well as processing means (not shown).

The processing means are technical means, preferably comprising at least one computer, a central processing or calculation unit, an analogue electronic circuit (preferably dedicated), a digital electronic circuit (preferably dedicated), and/or a microprocessor (preferably dedicated) and/or software means.

These processing means (not shown) are arranged, and/or programmed to supply data on at least one substance contained in the Fabry-Perot cavity 100, as a function of a processing of a signal received by the sensor 14 with the database (not shown).

The device 700 also comprises means for measuring and/or regulating the pressure inside the Fabry-Perot cavity 100 Turbolab 80 primary and secondary pump system (Oerlikon).

The device 700 also comprises conversion means (not shown) to convert a mode of the electromagnetic wave before the entry thereof into the Fabry-Perot cavity 100 and/or after the exit thereof from the Fabry-Perot cavity 100.

In this example, such conversion means (not shown) are arranged such that:
  the mode of the electromagnetic wave emitted by the emitter 13 and/or detected by the sensor 14 is a $TEM_{00}$ transverse electronic mode, which is the fundamental transverse mode and which has the same shape as a Gaussian beam, and/or
  the mode of the electromagnetic wave inside the Fabry-Perot cavity 100 is a $HE_{11}$ guided mode. It is a hybrid propagation mode which preserves the polarization of the radiation and also has low losses.
  the $TEM_{00}$ mode produced by the emitter 13 is coupled as efficiently as possible to the $HE_{11}$ mode of the guide.
  the wave transmitted by the guide is coupled as efficiently as possible to the sensor 14.

The coupling of the $TEM_{00}$ mode to the $HE_{11}$ guided mode is ideally 98%. The lens of the source 13 (focal length 25 mm) makes it possible to adapt the spatial dimensions of the electromagnetic wave emitted by the emitter 13 for effective coupling in the mode in question. Conversely, the $HE_{11}$ mode is projected almost entirely into a Gaussian mode at the exit from the guide 200, and the lens of the sensor 14 focuses the electromagnetic wave on the diode of the sensor 14. This $HE_{11}$ mode also preserves the polarization of the electromagnetic wave, and the Schottky diode of the sensor 14 makes it possible to detect the electromagnetic wave. Other sufficiently sensitive THz wave detectors are compatible with the present disclosure (bolometric, piezoelectric detector etc.).

Such a device 700 can be implemented in an embodiment of the method according to the present disclosure as described below, using in particular:
  the first reflector 11 and the second reflector 12,
  the Fabry-Perot cavity 100 comprising the inlet E1 formed by the first reflector 11 and the outlet S1 formed by the first 11 or the second 12 reflector, the Fabry-Perot cavity 100 having a length delimited by the first 11 and the second 12 reflector.

This embodiment of the method according to the present disclosure comprises the following steps:
  emitting the electromagnetic wave with a wavelength λ greater than 100 μm and/or less than 3 mm at the inlet E1 of the Fabry-Perot cavity 100, this emission being carried out by the emitter 13,
  propagating the electromagnetic wave in the Fabry-Perot cavity 100, from the inlet E1 of the Fabry-Perot cavity 100 to the outlet S1 thereof, this propagation being carried out by a guide 200, the guide forming a hollow tube extending in the lateral direction D1, the inside of the tube 200 comprising the lateral cavities 2a-2c,
  guiding the electromagnetic wave in the Fabry-Perot cavity 100 by the lateral cavities 2a-2c,
  detecting the electromagnetic wave exiting via the outlet S1 of the Fabry-Perot cavity 100, this detection preferably being carried out by the sensor 14.

In this example:
the lateral cavities 2a-2c are spaced out regularly between the first 11 and second 12 reflector by the pitch P;
the pitch P is determined as a function of the wavelength λ or of the wavelength working interval λ which it is desired to implement;
the length w is determined as a function of the wavelength λ or of the wavelength working interval λ which it is desired to implement;
the thickness d is determined as a function of the wavelength λ or the wavelength working interval λ which it is desired to implement;
a step of translational movement in the longitudinal direction of at least one, preferably both, of the first reflector 11 and the second reflector 12 is carried out so as to vary the length of the Fabry-Perot cavity 100, this translational movement being carried out by the at least one actuator 31, 32; preferably, a step of translational movement is more specifically carried out by the first actuator 31 of the first reflector 11 in the longitudinal direction D1, and a step of translational movement is carried out by the second actuator 32 of the second reflector 12 in the longitudinal direction D1;
a step of variation of the wavelength λ is carried out within the interval called working interval thereof, this variation being carried out by the emitter 13;
a step of driving by control means (not shown) of the emitter 13 and the at least one actuator 31, 32 is carried out, so as to:
  vary the wavelength λ of the electromagnetic wave emitted by the emitter 13,
  receive a signal received by the sensor 14 during variation of the wavelength λ,
  control the length of the Fabry-Perot cavity 100 as a function of the signal received by the sensor 14 so as to maximize an amplitude or power or intensity of the signal received by the sensor 14;
a step of processing the signal received by the sensor 14 with the database (not shown) and a step of supplying data on at least one substance contained in the Fabry-Perot cavity 100 is carried out as a function of this processing step, these steps of processing and supplying data being carried out by the processing means (not shown); for example, a step of processing the signal is carried out to identify target species with the aid of databases habitually used in the defined spectral range;
a step of measuring and/or regulating the pressure inside the Fabry-Perot cavity 100 is carried out with the aid of measurement and/or regulation means (not shown); the pressure is preferably regulated to a value less than 1 mbar: such a "vacuum" makes it possible to avoid atmospheric losses which would have a negative effect on the finesse of the cavity 100;
a step of converting a mode of the electromagnetic wave before the entry thereof into the Fabry-Perot cavity 100 and/or after the exit thereof from the Fabry-Perot cavity 100 is carried out, this conversion being carried out by the conversion means (not shown); typically:

the step of emitting by the emitter 13 and/or detecting by the sensor 14 can be emission and/or detection of the electromagnetic wave in the $TEM_{00}$ mode, and/or the step of propagating can be a propagation of the electromagnetic wave inside the Fabry-Perot cavity 100 in the $HE_{11}$ mode, which has the lowest losses.

Power Transmitted from the Device 700

In an example implementation of the present disclosure, the wavelength λ is varied, and thus the frequency ν (which can also be denoted f) of the electromagnetic wave emitted by the emitter 13. It is thus possible to obtain the power transmitted from the device 700 as a function of the frequency ν which has a succession of maximums consisting of resonance peaks.

Figure 3:
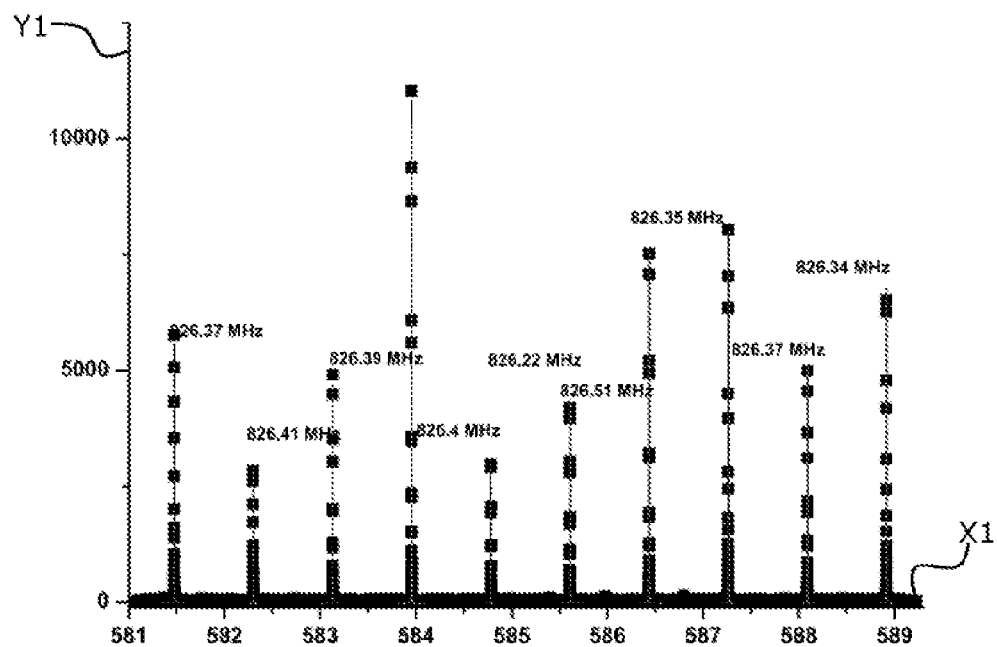
FIGS. 3 and 4 represent in graphic form results of measurements of a power transmitted by the device 700 according to the present disclosure as a function of the frequency of an emitter of the device 700.

Such resonance peaks are shown on the graph in FIG. 3 in which the X-axis X1 is the frequency ν of the electromagnetic wave measured by the sensor 14, comprised between 581 GHz and 590 GHz, and the Y-axis Y1 is the power transmitted (arbitrary units).

To obtain the results in FIG. 3, the pressure inside the Fabry-Perot cavity 100 was regulated by regulation means (not shown) so as to reach a pressure less than 0.01 mbar. Such a pressure makes it possible to optimize the operation of the device 700 by limiting the atmospheric absorption essentially associated with water vapour.

The frequency interval between each maximum is called "free spectral interval" (FSI) and, in this example, is calculated by the following equation:

$$FSI = \frac{C}{2L} = 826.35 \pm 0.01 \text{ MHz}$$

where C corresponds to the speed of light in a vacuum, and L corresponds to the physical length of the guide. In this example, L=180.80 mm.

Finesse

One of the defining and pertinent characteristics of the device 700 for the applications envisaged, which are in particular analysis of trace gas and/or the study of molecular transitions of very low intensities, is the finesse defined by the following equation:

$$\text{Finesse} = \frac{FSI}{\Delta \nu}$$

where Δν corresponds to the full frequency width of a resonance peak at half-height.

It is also possible to characterize the device by the quality coefficient:

$$Q = \frac{\nu_0}{\Delta \nu}$$

With $\nu_0$ a resonance frequency (frequency at which the transmission is maximum).

Figure 4:
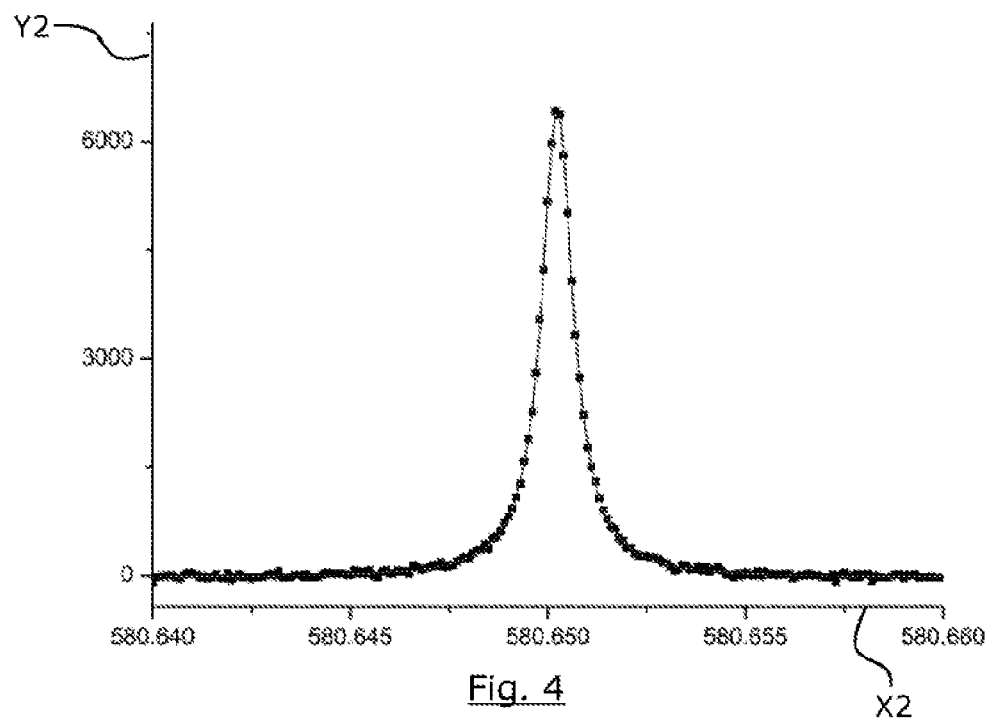

An adjustment on a recording produced at high spectral resolution of a resonance peak, as shown in FIG. 4, makes it possible to obtain a measurement of Δν. In FIG. 4, the X-axis X2 is the frequency ν of the electromagnetic wave measured by the sensor 14, comprised between 580.640 GHz and 580.660 GHz, and the Y-axis Y2 is the power detected (arbitrary units).

The finesse of the device 700 as well as its quality coefficient Q exceeds all the known values in the state of the prior art:

$$\text{Finesse} = \frac{FSI}{\Delta \nu} = \frac{826.35}{0.95} > 850$$

$$Q = \frac{580000}{0.95} > 600000$$

The performances of the device 700, in terms of finesse, are limited by the following two factors: on the one hand, the insufficient reflection coefficient of the inductive grids 11 and 12; on the other hand, the transmission losses of the guide 200.

At this stage, according to the inventors, it appears difficult to identify which of the two above-mentioned factors limits the finesse obtained.

Finesse, reflection of the inductive grids 11 and 12 and losses G in the guide are linked by the following equation:

$$\text{Finesse} = \frac{FSI}{\Delta \nu} = \frac{\pi}{1 - R + G}$$

where R is a power reflection coefficient of an inductive grid with:

$$A + T + R = 1$$

where A denotes the absorption due to one pass through the inductive grid and T denotes the transmission coefficient.

In this example, a finesse of 850 results in losses of 1−R+G=0.36%.

Gas Analysis

The inventors have used a device 700 to produce the equivalent of a "multipass cell" to reach interaction lengths that are difficult to access in the range of frequencies typically comprised between 100 and 3000 GHz.

It is demonstrated that the equivalent optical path $L_{eq}$ of a Fabry-Perot resonator is proportional to the finesse of the device 700:

$$L_{eq} = \frac{2FL}{\pi} = \frac{2 * 850 * 0.18}{\pi} \approx 97 \text{ m}$$

where F is the finesse and L the physical length of the cavity 100.

Thus an absorption cell is available which has an optical path approximately 100 m in length with a limited bulk.

An important difference with respect to spectroscopic investigations of the infrared (1-10 μm of wavelength) relates to the width of the absorption rays. As the width of the rays is proportional to the frequency ν at low pressure, the rays are much smaller in the THz domain than in the infrared. As a result, the difficulty is adjusting the length of the cavity 100 to cause the frequency of a molecular transition and the resonance of the device 700 to coincide, and to retain this coincidence by sweeping the frequency ν of the emitter 13.

To this end, according to an embodiment described above, the inventors used two piezoelectric actuators 31 and 32 and a frequency-modulated emitter 13.

Thus, in passing around a resonance of the device 700, synchronous detection makes it possible to isolate the harmonics 1 and 2 of the signal received by the sensor 14, these harmonics being respectively representative of the first and second derivative of the resonance peak. The first derivative generates an error signal which via the PID, drives the actuators 31 and 32 to control the length of the Fabry-Perot cavity 100 at the transmission maximum. The second derivative is characteristic of the power transmission of the device 700 and thus of the molecular resonance.

The inventors tested the ability to identify a gas with such a device 700 and to evaluate the sensitivity thereof. The test was carried out with a reference gas often used to calibrate spectrometers, in this case a minority carbonyl sulfide isotope ($^{18}O^{12}C^{32}S$) having a natural abundance of 0.188%. Such a gas has many molecular transitions over a very large spectral range. The ray targeted at approximately 592.66789 GHz (J=52←51) has an intensity S (at ambient temperature):

$$S=2.467*10^{-24} \text{ cm}^{-1}/(\text{molecule·cm}^{-2}) J=52\leftarrow 51$$

This intensity is available in various databases (not shown). This unit is commonly used in spectroscopy and adopted by different databases including HITRAN. This intensity makes it possible to calculate the absorption of a gas by using the Beer-Lambert law.

$$I(v)=I_0 e^{-\alpha(v)l}$$

where $\alpha(v)$ denotes the absorption in cm$^{-1}$, l denotes the interaction length in cm, $I_0$ denotes the intensity of the emitter 13, and I(v) denotes the intensity transmitted, with:

$$\alpha(v)=NSg_D,$$

where N denotes the concentration of target molecules in molecule/cm$^{-3}$, S denotes the intensity of the target transition cm$^{-1}$/(molecule·cm$^{-2}$), $g_D$ denotes a ray shape standardized at 1 which depends on the pressure. At low pressure, under Doppler broadening, $g_D$ is a Gaussian:

$$g_D(v) = \frac{\sqrt{\ln 2}}{\sqrt{\pi} \Delta v_D} e^{-\left[\left(\frac{v-v0}{\Delta v_D}\right)^2 \ln(2)\right]}$$

$$\Delta v_D = 3.58*10^{-7} v0 \sqrt{\frac{T}{M}} \approx 1.557*10^{-5} \text{cm}^{-1} \approx 0.469 \text{ MHz}$$

where v0 is the central frequency of the molecular transition, $\Delta v_D$ is the Doppler half-width at half the height of the transition in question expressed as a wave number ($\sigma=1/\lambda$) in cm$^{-1}$, T is the temperature (here 300 K), and M is the molar mass of the molecule (62 for the targeted isotope).

Thus, for a pressure of 55 μbar, N=1.33*10$^{+15}$ molecules/cm$^{-3}$ and $\alpha(v=v0)=1.003*10^{-4}$ cm$^{-1}$.

There is great benefit in having the largest possible interaction path, whether for studying low-intensity transitions or low-concentration molecules.

Thus, using the Beer-Lambert law:
an interaction path of 1 m corresponds to an absorption of 0.998%,
an interaction path of 10 m corresponds to an absorption of 9.98%.

The experimental protocol described above makes it possible to obtain a signal characteristic of the molecular absorption which, in this example, is proportional to the absorbency of the target molecular transition:

$$\text{Signal detected} \propto a(v)l = -\ln\left(\frac{I}{I_0}\right)$$

Figure 5:
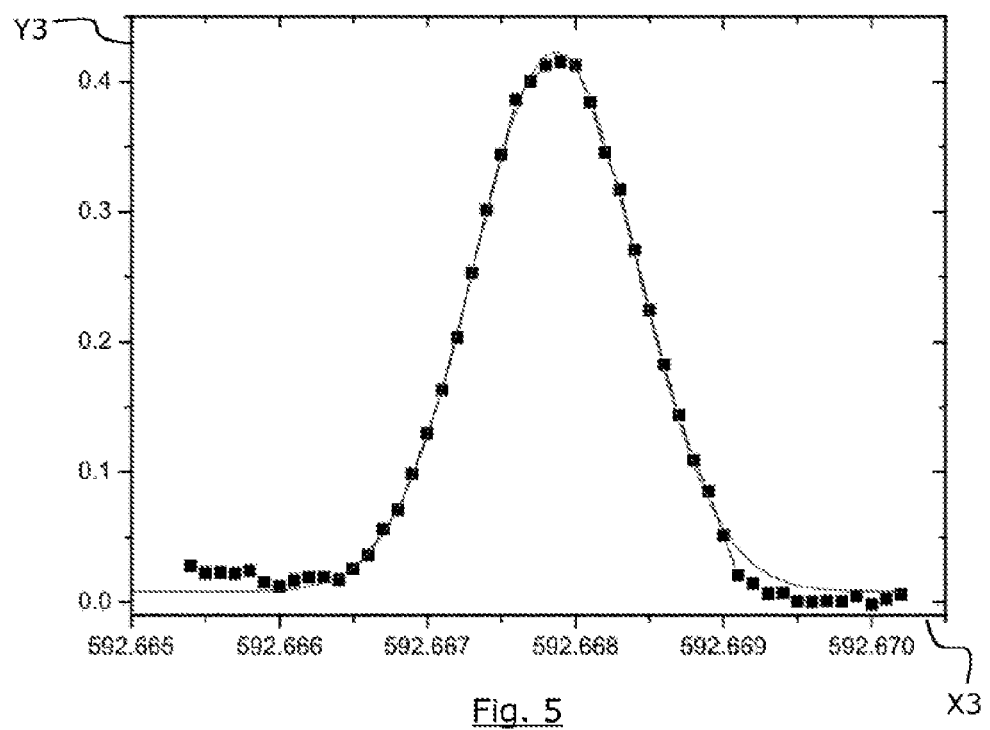
FIG. 5 represents in graphic form results of measurements characteristic of a molecular absorption at the level of the device 700 according to the present disclosure as a function of the frequency of an emitter of the device 700.

Such a signal is represented in the graph in FIG. 5, in which the X-axis X3 corresponds to the frequency v in GHz and the Y-axis Y3 corresponds to the molecular absorption (arbitrary units).

These results indicate that the present disclosure should make it possible to record transitions the intensities of which are less than 10$^{-26}$ cm$^{-1}$/(molecule·cm$^{-2}$) with a measurement time of the order of one minute at approximately 600 GHz.

The present disclosure makes it possible to easily implement a Fabry-Perot resonator and thus offer access to all the applications known in other spectral domains while benefiting from the advantages of working in the THz domain.

In particular, systems for detecting and quantifying traces of gas making use of a technique of the cavity ring down spectroscopy and/or cavity enhanced absorption spectroscopy (CEAS) type can from now on be envisaged due to the finesse of the device 700.

The excellent selectivity of the THz domain allows multispecies detection with excellent detection limits.

Monitoring of the atmosphere or industrial processes should also benefit from this advance.

Ultrasensitive THz analysis of exhaled air could help in medical diagnosis.

Monitoring of the freshness of foodstuffs could also benefit from this advance.

Systems intended for the infrared, often dedicated to a target molecule, are often limited by interferents. The transition widths are indeed shown to be much more significant than in the THz domain, thus degrading the selectivity.

Of course, the present disclosure is not limited to the examples that have just been described, and numerous modifications may be made to these examples without exceeding the scope of the present disclosure. In addition, the various features, forms, variants and embodiments of the present disclosure can be combined together in various combinations, to the extent that they are not incompatible or mutually exclusive.

In an embodiment that is not shown:
the inlet E1 and the outlet S1 are delimited by the first reflector 11. The emitter 13 and the sensor 14 are then both positioned on the side of the first reflector 11 and are separated by a separating blade or by any other means of separation between the wave entering the cavity and the wave leaving the cavity based for example on polarization effects; and/or
the inductive grids of the reflectors 11, 12 can be replaced by any means having a good reflection coefficient and a minimum transmission loss in the THz domain; and/or
the emitter 13 can be replaced by an emitter assembly; and/or
the sensor 14 can be replaced by a sensor assembly; and/or
the reflector 11 and/or 12 can be curved
each reflector 11, 12 preferably each comprises an inductive or capacitive grid; in an alternative, the device 700 thus also comprises:
injection means (comprising for example a nozzle, a duct, and/or a pump, etc.) arranged to inject gas outside of the Fabry-Perot cavity 100, the device 700 being arranged to allow this gas to pass from the injection means then from the outside of the cavity 100 to the inside of the cavity 100 through the grid (capacitive (preferably devoid of substrate) or inductive) of the reflector 11 and/or 12; and evacuation means (comprising for example a nozzle, a duct, and/or a pump, etc.) arranged to evacuate gas from outside of the Fabry-Perot cavity 100, the device 700 being arranged to allow this gas to pass from the inside of the cavity 100 towards the outside of the cavity 100 through the grid (inductive or capacitive) of the reflector 11 and/or 12 in the direction of the evacuation means.

Usually, a capacitive grid is formed of studs on a substrate. However, in the context of a device according to the present disclosure it is preferably possible to use a "porous" capacitive grid devoid of substrate or for which the substrate is pierced between the mesh of the capacitive grid.

In addition, an alternative of the method according to the present disclosure can comprise a measurement of the losses of the guide 200 and/or reflection coefficients of the reflectors 11, 12 of the guide 200.

The present disclosure indeed also makes it possible to determine the two important parameters (reflection coefficients of the reflectors 11, 12 and losses of the guide 200) which condition the finesse of the present disclosure. It is indeed difficult according to the state of the art to measure reflection coefficients close to 1 and to evaluate the losses of a very low-loss guide such as the corrugated guides used in the present disclosure.

The measured finesse F (850 in the current demonstration) is expressed as:

$$F = \frac{\pi \cdot \sqrt{R \cdot e^{-zL}}}{1 - R \cdot e^{-zL}}$$

R: denotes the reflectivity of each of the reflectors 11, 12 implemented (assumed to be identical here)
z: denotes the losses of the guide 200
L: denotes the physical length of the interferometer (of the present disclosure), i.e. the distance which separates the two reflectors 11, 12

A method for determining "R" and "z" thus consists of measuring the finesse of two devices according to the present disclosure (the same device according to the present disclosure set according to two different cavity lengths or two separate devices according to the present disclosure with two different cavity lengths) using one and the same pair of reflectors 11, 12 and one and the same type of guide 200 (i.e. of the same material, and the same pitch P, cavity length w, minimum inner diameter a, cavity thickness d characteristics), but with two different lengths L separating the two reflectors 11, 12 (and preferably also two different total guide lengths 200). Thus the following are provided (by measurement):

the finesse of the device according to the present disclosure using a length L1 which separates the two reflectors 11, 12:

$$F_1 = \frac{\pi \cdot \sqrt{R \cdot e^{-zL_1}}}{1 - R \cdot e^{-zL_1}}$$

Then the finesse of the device according to the present disclosure using a length L2 which separates the two reflectors 11, 12:

$$F_2 = \frac{\pi \cdot \sqrt{R \cdot e^{-zL_2}}}{1 - R \cdot e^{-zL_2}}$$

The total length of the guide 200 is equal to the length of the cavity, plus or minus several tens or hundreds of micrometers.

These two relationships constitute two equations having two unknowns, from which "R" and "z" are calculated and obtained. This calculation is carried out by calculation means which are technical means, preferably comprising at least one computer, a central processing or calculation unit, an analogue electronic circuit (preferably dedicated), a digital electronic circuit (preferably dedicated), and/or a microprocessor (preferably dedicated) and/or software means.

For example:
$L_1 = L_2/2$ is used.
The loss z is an item of data per unit of length, i.e. independent of the length of the guide 200.

The invention claimed is:

1. Device comprising:
a first reflector and a second reflector,
a Fabry-Perot cavity comprising an inlet formed by the first reflector and an outlet formed by the first or the second reflector, the Fabry-Perot cavity having a length delimited by the first and the second reflector,
an emitter arranged to emit an electromagnetic wave with a wavelength λ greater than 100 μm and less than 3 mm at the inlet of the Fabry-Perot cavity,
a guide arranged to propagate the electromagnetic wave in the Fabry-Perot cavity, from the inlet of the Fabry-Perot cavity to the outlet thereof,
a sensor arranged to detect the electromagnetic wave exiting via the outlet of the Fabry-Perot cavity,
wherein the guide forms a hollow tube extending in a longitudinal direction, the inside of the tube comprising a plurality of lateral cavities arranged to guide the electromagnetic wave in the Fabry-Perot cavity.

2. Device according to claim 1, in which the lateral cavities are spaced apart by a pitch P, between the first and the second reflector.

3. Device according to claim 2, in which each pitch P is equal to λ/3±30%.

4. Device according to claim 1, in which each lateral cavity has a length w, defined parallel to the longitudinal direction of the guide, equal to λ/6±30%.

5. Device according to claim 4, in which the length w is less than or equal to half of the pitch P.

6. Device according to claim 1, in which each lateral cavity has a thickness d, defined perpendicular to the longitudinal direction of the guide, equal to λ/4±20%.

7. Device according to claim 1, in which the tube has a minimum inner diameter a greater than 10λ.

8. Device according to claim 1, in which the first reflector and the second reflector each comprise an inductive grid or a capacitive grid.

9. Device according to claim 1, also comprising at least one actuator arranged to provide translational movement in the longitudinal direction of at least one from the first reflector and the second reflector so as to vary the length of the Fabry-Perot cavity.

10. Device according to claim 1, characterized in that the emitter is arranged to vary the wavelength λ.

11. Device according to claim 10, also comprising control means arranged and/or programmed to drive the emitter and the at least one actuator so as to:
- vary the wavelength λ of the electromagnetic wave emitted by the emitter,
- receive a signal received by the sensor during variation of the wavelength λ,
- control the length of the Fabry-Perot cavity as a function of the signal received by the sensor so as to maximize an amplitude or power or intensity of the signal received by the sensor.

12. Device according claim 1, also comprising a database referencing several substances, and comprising processing means arranged, and/or programmed, as a function of a processing of a signal received by the sensor with the database, to supply data on at least one substance contained in the Fabry-Perot cavity.

13. Device according to claim 1, also comprising means for measurement and/or regulation of the pressure inside the Fabry-Perot cavity.

14. Device according to claim 1, also comprising conversion means for converting a mode of the electromagnetic wave before the entry thereof into the Fabry-Perot cavity or after the exit thereof from the Fabry-Perot cavity.

15. Device according to claim 14, in which the conversion means are arranged so that:
- the mode of the electromagnetic wave emitted by the emitter and/or detected by the sensor is a $TEM_{00}$ mode, or
- the mode of the electromagnetic wave inside the Fabry-Perot cavity is an $HE_{11}$ mode.

16. Method implemented in a device comprising:
a first reflector and a second reflector,
a Fabry-Perot cavity comprising an inlet formed by the first reflector and an outlet formed by the first or the second reflector, the Fabry-Perot cavity having a length delimited by the first and the second reflector,
the method being characterized in that it comprises:
emitting the electromagnetic wave with a wavelength λ greater than 100 μm and less than 3 mm at the inlet of the Fabry-Perot cavity, this emission being carried out by an emitter,
propagating the electromagnetic wave in the Fabry-Perot cavity, from the inlet of the Fabry-Perot cavity to the outlet thereof, this propagation being carried out by a guide, the guide forming a hollow tube extending in a longitudinal direction, the inside of the tube comprising a plurality of lateral cavities,
guiding the electromagnetic wave in the Fabry-Perot cavity by the lateral cavities,
detecting the electromagnetic wave exiting via the outlet of the Fabry-Perot cavity, this detecting preferably being carried out by a sensor.

17. Method according to claim 16, comprising a measurement of the losses of the guide or of a reflectivity of at least one or each of the reflectors, by:
two measurements of finesse of the device or of devices according to the invention using the same reflectors and the same type of guide, but with two different lengths separating the two reflectors, and
from these two finesse measurements, calculating the losses of the guide or a reflectivity of at least one or each of the reflectors, by resolution of a system of two equations with two unknowns.

* * * * *